United States Patent
Seok et al.

(10) Patent No.: US 11,612,002 B2
(45) Date of Patent: Mar. 21, 2023

(54) SYSTEM AND METHOD FOR SYNCHRONOUS INDEPENDENT CHANNEL ACCESS IN A WIRELESS NETWORK

(71) Applicant: MediaTek Singapore Pte. Ltd., Singapore (SG)

(72) Inventors: Yongho Seok, San Jose, CA (US); Jianhan Liu, San Jose, CA (US); James Chih-Shi Yee, San Jose, CA (US); Thomas Edward Pare, Jr., San Jose, CA (US); Chung-Ta Ku, Jr., San Jose, CA (US); Weisung Tsao, San Jose, CA (US); Po-Yuen Cheng, San Jose, CA (US)

(73) Assignee: MEDIATEK SINGAPORE PTE. LTD., Singapore (SG)

( * ) Notice: Subject to any disclaimer, the term of this patent is extended or adjusted under 35 U.S.C. 154(b) by 0 days.

(21) Appl. No.: 16/828,606

(22) Filed: Mar. 24, 2020

(65) Prior Publication Data
US 2020/0314920 A1    Oct. 1, 2020

Related U.S. Application Data

(60) Provisional application No. 62/838,976, filed on Apr. 26, 2019, provisional application No. 62/825,074, filed on Mar. 28, 2019.

(51) Int. Cl.
*H04W 74/08* (2009.01)
*H04W 80/02* (2009.01)

(52) U.S. Cl.
CPC ... *H04W 74/0891* (2013.01); *H04W 74/0808* (2013.01); *H04W 80/02* (2013.01)

(58) Field of Classification Search
CPC ........... H04W 56/003; H04W 74/0816; H04W 74/0891; H04W 48/16; H04W 74/0808;
(Continued)

(56) References Cited

U.S. PATENT DOCUMENTS 10,939,476 B1 * 3/2021 Chu ...................... H04W 76/18
2005/0286446 A1 * 12/2005 Barber ................... H04L 1/1854
370/278
(Continued)

FOREIGN PATENT DOCUMENTS

| CN | 102652418 A | 8/2012 |
| CN | 103222311 B | 7/2013 |

(Continued)

OTHER PUBLICATIONS

Hongyuan Zhang (Marvell): "EHT Technology Candidate Discussions"; I EEE Draft; 11-18-1161-00-0EHT-EHT-Technology-Candidate-Discussions, IEEE-SA Mentor, Piscataway, NJ USA. vo 1. 802. 11 EHT. Jul. 9, 2018 (Jul. 9, 2018), pp. 1-10, XP068128228,Retrieved from the Internet:URL:https://mentor.ieee.org/802.11/dcn/18/11-18-1161-00-0eht-eht-technology-candidate-discussions.pptx[retrieved on Jul. 9, 2018]* p. 3-p. 5.

(Continued)

*Primary Examiner* — Wutchung Chu

(57) ABSTRACT

Embodiments of the present invention provide systems and methods for synchronous independent channel access in a wireless network. The synchronous independent channel access can be performed by a wireless station having multiple transceivers for simultaneous communication over multiple wireless bands. A wireless station can connect wirelessly to a wireless access point to access a first primary wireless band during a transmission opportunity, and can use early access on a second primary wireless band without receiving a transmission opportunity. The transmission and reception of data frames over the different primary channels are synchronized to prevent or mitigate inter-channel interference. According to some embodiments, the channels are synchronized using back-off procedures and/or padding to (Continued)

align the ending time of transmitted and received data frames, for example.

19 Claims, 21 Drawing Sheets

(58) Field of Classification Search
CPC . H04W 74/0833; H04W 80/02; H04W 84/12; H04W 88/06; H04W 52/02; H04W 74/08; H04W 16/28; H04W 74/00; H04W 16/02; H04W 72/082; H04W 72/1242; H04W 74/085; H04W 72/1273; H04W 64/00; H04W 72/1268; H04W 56/0005; H04W 52/0216; H04W 72/0446; H04W 28/06; H04W 52/0235; H04W 72/04; H04W 52/0229; H04W 74/006; H04W 16/14; H04W 28/065; H04W 72/02; H04W 52/0206; H04W 72/0453; H04W 74/04; H04W 74/002; H04W 28/04; H04W 24/02; H04W 28/20; H04L 1/188; H04L 5/0092; H04L 5/0055; H04L 27/2602; H04L 47/41; H04L 5/0094; H04L 5/003; H04L 5/0023; H04L 1/1614; H04L 1/1621; H04L 1/00; H04L 27/26; H04L 1/1812; H04L 5/0007; H04L 5/0053; H04B 7/0404; H04B 7/0452

See application file for complete search history.

(56) References Cited

U.S. PATENT DOCUMENTS

| | | | | |
|---|---|---|---|---|
| 2006/0165078 A1* | 7/2006 | Gopinath | ............... | H04W 48/04 370/389 |
| 2011/0116401 A1* | 5/2011 | Banerjea | ............... | H04W 74/08 370/252 |
| 2011/1016401 | 5/2011 | Banerjea et al. | | |
| 2011/0222493 A1* | 9/2011 | Mangold | ............... | H04B 1/1027 370/329 |
| 2012/0314673 A1 | 12/2012 | Noh et al. | | |
| 2014/0341163 A1* | 11/2014 | Zhang | .................... | H04B 7/024 370/329 |
| 2016/0014725 A1 | 1/2016 | Yu et al. | | |
| 2016/0056930 A1* | 2/2016 | Seok | ....................... | H04L 5/005 370/330 |
| 2016/0233902 A1* | 8/2016 | Choudhary | ....... | H04W 72/1215 |
| 2016/0381565 A1* | 12/2016 | Oteri | .................... | H04W 28/18 370/328 |
| 2017/0013539 A1* | 1/2017 | Lepp | ................. | H04W 52/0229 |
| 2017/0086194 A1 | 3/2017 | Tavildar et al. | | |
| 2017/0134989 A1* | 5/2017 | Hirsch | .................. | H04W 28/26 |
| 2017/0231008 A1* | 8/2017 | Ahn | .................... | H04W 74/006 |
| 2017/0338935 A1* | 11/2017 | Ahn | .................... | H04W 72/0446 |
| 2017/0367117 A1* | 12/2017 | Ahn | ....................... | H04W 84/12 |
| 2020/0120458 A1* | 4/2020 | Aldana | ................... | H04W 4/80 |
| 2020/0221504 A1* | 7/2020 | Cirik | ..................... | H04L 1/1864 |
| 2020/0322889 A1* | 10/2020 | Chitrakar | .......... | H04W 52/0235 |

FOREIGN PATENT DOCUMENTS

| | | |
|---|---|---|
| CN | 106304390 A | 1/2017 |
| CN | 106936553 A | 7/2017 |
| CN | 107409430 A | 11/2017 |
| TW | 201724815 A | 7/2017 |

OTHER PUBLICATIONS

Simone Merlin (Qualcomm): "Duration and Mac Padding for MU PPDUS" IEEE Draft; 11-15-0876-01-00AX-Duration-and-Mac-Padding-for-MU-PPDUS, IEEE-SA Mentor, Piscataway, NJ USA vo 1. 802. 11ax, No. 1 Jul. 16, 2015 (Jul. 16, 2015), pp. 1-16, XP068119992, Retrieved from the Internet: URL:https://mentor.ieee.org/802.11/dcn/15/11-15-0876-01-00ax-duration-and-mac-padding-for-mu-ppdus.pptx [retrieved on Jul. 16, 2015] p. 9-p. 13.

* cited by examiner i) Simultaneous transmissions from different TIDs ii) Simultaneous transmissions of fragment frames belonging to same TID

SYSTEM AND METHOD FOR SYNCHRONOUS INDEPENDENT CHANNEL ACCESS IN A WIRELESS NETWORK

CROSS-REFERENCE TO RELATED APPLICATIONS

This application claims the benefit of and priority to provisional patent application Ser. No. 62/838,976, with filing date Apr. 26, 2019, and provisional patent application Ser. No. 62/825,074, with filing date Mar. 28, 2019, which are both hereby incorporated by reference in their entirety.

FIELD

Embodiments of the present invention generally relate to the field of wireless communications. More specifically, embodiments of the present invention relate to systems and methods for independent channel access in a wireless network.

BACKGROUND

Modern electronic devices typically send and receive data with other electronic devices wirelessly using Wi-Fi, and many of these devices are "dual band" devices that include at least two wireless transceivers capable of operating in different frequency bands e.g., 2.4 GHz and 5 GHz. In most cases, a wireless device will communicate over only a single band at a time. For example, older and low-power devices e.g., battery powered devices, often operate on the 2.4 GHz band. Newer devices and devices that require greater bandwidth often operate on the 5 GHz band.

However, in some cases, the use of a single band may not satisfy the bandwidth needs of certain devices. Therefore, some developing approaches to wireless communication increase communication bandwidth by operating on multiple bands concurrently (link aggregation), and can control which wireless device or devices can use the multiple bands, for example, based on current network traffic.

After completing a frame exchange sequence, a wireless station (STA) typically performs an enhanced distributed channel access function (EDCAF) on the primary channel from which the TXOP is obtained and invokes an enhanced distributed channel access (EDCA) back-off procedure. An EDCAF performed on another primary channel that uses an early access of the TXOP typically resumes an EDCA back-off procedure (e.g., continue the previous back-off counter). However, using this approach, an EHT STA typically has a higher channel access probability than legacy STAs. Therefore, what is needed is an approach to link aggregation channel access that determines a back-off procedure for EDCA channel access that improves the fairness of channel access and back-off procedures so that legacy devices also have an opportunity to transmit data using link aggregation.

SUMMARY

Accordingly, embodiments of the present invention provide a method and apparatus for synchronous independent channel access using enhanced back-off procedures and/or padding to improve advantageously the performance and efficiency of multi-channel communication and improve the transmission opportunities of legacy devices.

Embodiments of the present invention provide systems and methods for synchronous independent channel access in a wireless network. The synchronous independent channel access can be performed by a wireless station having multiple transceivers for simultaneous communication over multiple wireless bands. A wireless station can connect wirelessly to a wireless access point to access a first primary wireless band during a transmission opportunity, and can use early access on a second primary wireless band without receiving a transmission opportunity. The transmission and reception of data frames over the different primary channels are synchronized to prevent or mitigate inter-channel interference. According to some embodiments, the channels are synchronized using back-off procedures and padding to align the ending time of transmitted and received data frames, for example.

According to one embodiment, a method of synchronous independent channel access is disclosed. The method includes performing independent enhanced distributed channel access function (EDCA) channel access on the first primary wireless channel and a second primary wireless channel, encoding a first MAC protocol data unit (MPDU) for transmission on the first primary wireless channel, encoding a second MPDU for transmission on the second primary wireless channel, transmitting the first MPDU on the first primary wireless channel, and transmitting the second MPDU on the second primary wireless channel in synchronization with the transmitting the first MPDU on the first primary wireless channel.

According to some embodiments, the method also includes performing carrier sensing to determine that the second primary wireless channel is idle and accessing the second primary wireless channel using early access when the second primary wireless channel is idle.

According to some embodiments, performing carrier sensing includes performing physical carrier sensing and virtual carrier sensing.

According to some embodiments, the method further includes performing a first back-off procedure on the first primary wireless channel and a second back-off procedure on the second primary wireless channel to synchronize the transmitting the first MPDU on the first primary wireless channel and the transmitting the second MPDU on the second primary wireless channel.

According to some embodiments, the first back-off procedure includes a compensation factor based on a previous back-off counter.

According to some embodiments, the first back-off procedure includes a randomly selected value.

According to some embodiments, the method further includes pausing transmission on the first primary wireless channel to obtain a TXOP.

According to some embodiments, the first primary wireless channel includes a 6 GHz wireless channel and the second primary wireless channel includes a 5 GHz wireless channel.

According to some embodiments of the present invention, the first primary wireless channel includes a 6 GHz wireless channel and the second primary wireless channel includes a 6 GHz wireless channel.

According to some embodiments, the first primary wireless channel includes a 5 GHz wireless channel and the second primary wireless channel includes a 2.4 GHz wireless channel.

According to a different embodiment, a dual-band device for performing cooperative multi-band operation with a wireless access point (AP) for a wireless network is disclosed. The device includes a first transceiver configured to communicate over a first primary wireless band, a second transceiver configured to communicate over a second primary wireless band, where the first transceiver and the second transceiver are operable to communicate simultaneously, a cooperative management unit configured to exchange data with the first transceiver and the second transceiver for managing simultaneous communication of the first transceiver and the second transceiver, and a processor. The processor is operable to perform independent enhanced distributed channel access function (EDCA) channel access on the first primary wireless channel and a second primary wireless channel, encode a first MAC protocol data unit (MPDU) for transmission on the first primary wireless channel, and encode a second MPDU for transmission on the second primary wireless channel. The first and second transceivers are operable to transmit the first MPDU on the first primary wireless channel, and transmit the second MPDU on the second primary wireless channel in synchronization with the transmitting the first MPDU on the first primary wireless channel so that an ending time of the first MPDU is aligned with an ending time of the second MPDU.

According to some embodiments, the processor is further operable to perform carrier sensing to determine that the second primary wireless channel is idle and access the second primary wireless channel using early access when the second primary wireless channel is idle.

According to some embodiments, the carrier sensing includes performing physical carrier sensing and virtual carrier sensing.

According to some embodiments, the processor is further operable to perform a first back-off procedure on the first primary wireless channel and a second back-off procedure on the second primary wireless channel to synchronize the transmitting the first MPDU on the first primary wireless channel and the transmitting the second MPDU on the second primary wireless channel.

According to some embodiments, the first back-off procedure includes a compensation factor based on a previous back-off counter.

According to some embodiments, the first back-off procedure includes a randomly selected value.

According to some embodiments, the processor is further operable to pause transmission on the first primary wireless channel to obtain a TXOP.

According to some embodiments, the first primary wireless channel includes a 6 GHz wireless channel and the second primary wireless channel includes a 5 GHz wireless channel.

According to some embodiments, the first primary wireless channel includes a 6 GHz wireless channel and the second primary wireless channel includes a 6 GHz wireless channel.

According to another embodiment, a non-transitory computer-readable storage medium having embedded therein program instructions, which when executed by one or more processors of a device, causes the device to execute a process for performing synchronous independent channel access is disclosed. The method includes performing independent enhanced distributed channel access function (EDCA) channel access on the first primary wireless channel and a second primary wireless channel, encoding a first MAC protocol data unit (MPDU) for transmission on the first primary wireless channel, accessing the second primary wireless channel using early access when the second primary wireless channel is idle, encoding a second MPDU for transmission on the second primary wireless channel, transmitting the first MPDU on the first primary wireless channel, and transmitting the second MPDU on the second primary wireless channel in synchronization with the transmitting the first MPDU, wherein an ending time of the first MPDU is aligned with an ending time of the second MPDU.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION

Figure 1:
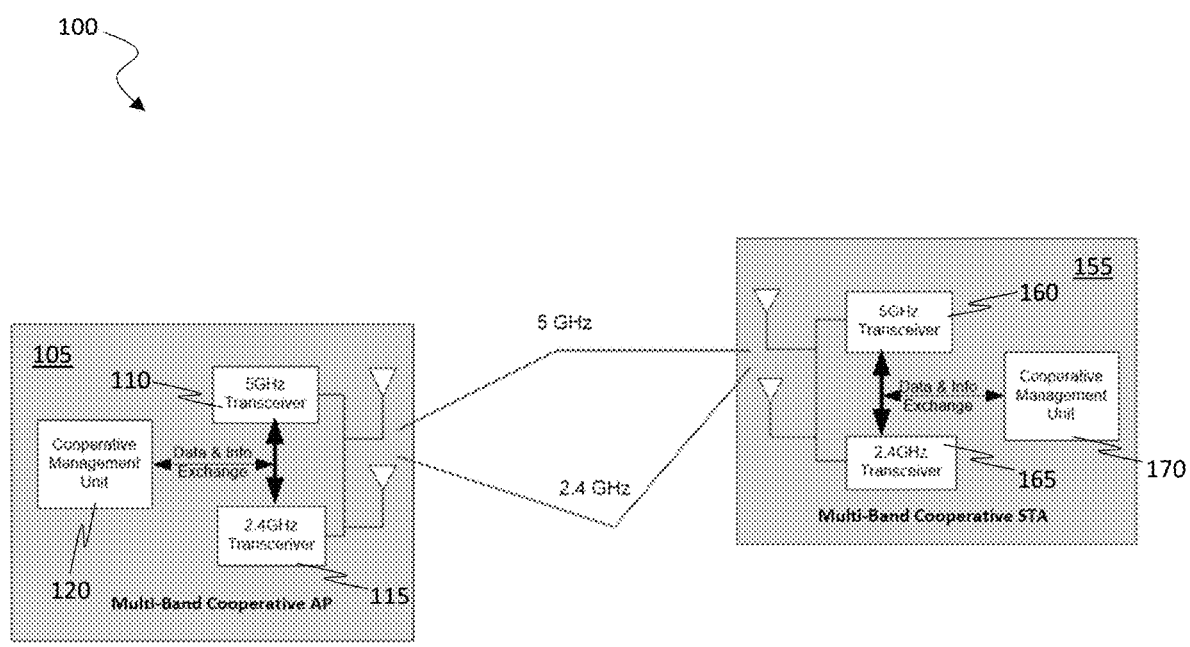
FIG. 1 is a block diagram of an exemplary wireless communication system or network including a multi-band cooperative wireless access point (AP) and a multi-band cooperative wireless station (STA) depicted according to embodiments of the present invention.

Reference will now be made in detail to several embodiments. While the subject matter will be described in conjunction with the alternative embodiments, it will be understood that they are not intended to limit the claimed subject matter to these embodiments. On the contrary, the claimed subject matter is intended to cover alternative, modifications, and equivalents, which may be included within the spirit and scope of the claimed subject matter as defined by the appended claims.

Furthermore, in the following detailed description, numerous specific details are set forth in order to provide a thorough understanding of the claimed subject matter. However, it will be recognized by one skilled in the art that embodiments may be practiced without these specific details or with equivalents thereof. In other instances, well-known methods, procedures, components, and circuits have not been described in detail as not to unnecessarily obscure aspects and features of the subject matter.

Portions of the detailed description that follows are presented and discussed in terms of a method. Although steps and sequencing thereof are disclosed in a figure herein (e.g., FIG. 20) describing the operations of this method, such steps and sequencing are exemplary. Embodiments are well suited to performing various other steps or variations of the steps recited in the flowchart of the figure herein, and in a sequence other than that depicted and described herein.

Some portions of the detailed description are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer-executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout, discussions utilizing terms such as "accessing," "writing," "coordinating," "storing," "transmitting," "associating," "identifying," "encoding," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

EHT Multi-Link Aggregation

As used herein, the term "EHT" may refer to a recent generation of wireless communication (Wi-Fi) known as Extremely High Throughput (EHT) and is defined according to the IEEE 802.11be standards. The term station (STA) may refer to an electronic device capable of sending and receiving data over Wi-Fi that is not operating as an access point (AP).

Embodiments of the present invention provide systems and methods for synchronous independent channel access in a wireless network. The synchronous independent channel access can be performed by a wireless station having multiple transceivers for simultaneous communication over multiple wireless bands. A wireless station can connect wirelessly to a wireless access point to access a first primary wireless band during a transmission opportunity, and can use early access on a second primary wireless band without obtaining a transmission opportunity. The transmission and reception of data frames over the different primary channels are synchronized to prevent or mitigate inter-channel interference. According to some embodiments, the channels are synchronized using back-off procedures and padding to align the ending time of transmitted and received data frames, for example. In other words, the transmission of MPDUs can be synchronized such that the ending time of a first MPDU is aligned with an ending time of a second MPDU.

Multi-link operations can provide higher network throughput and improved network flexibility compared to traditional techniques for wireless communication. With regard to FIG. 1, an exemplary wireless communication system 100 including a multi-band cooperative AP 105 and a multi-band cooperative STA 155 are depicted according to embodiments of the present invention. The multi-band cooperative AP 105 includes a 5 GHz transceiver 110 and a 2.4 GHz transceiver 115. Other types of transceivers that operate on different bands, such as 6 GHz and above, can also be used by the multi-band cooperative AP 105 according to embodiments of the present invention. The transceivers 110 and 115 of AP 105 exchange data and information with cooperative management unit 120 that coordinates information sent and/or received by transceivers 110 and 115.

The multi-band cooperative ST 155 includes a 5 GHz transceiver 160 and a 2.4 GHz transceiver 165. Other types of transceivers that operate on different bands, such as 6 GHz and above, can also be used by the multi-band cooperative STA 155 according to some embodiments of the present invention. The transceivers 160 and 165 of STA 155 exchange data and information with cooperative management unit 170 that coordinates information sent and received by transceivers 160 and 165 using 5 GHz band wireless communication and 2.4 GHz band wireless communication, respectively.

The multi-band cooperative AP 105 and the multi-band cooperative STA 155 have simultaneous transmission and reception capabilities for communicating using different wireless bands. The transmitters operating on the different bands can perform independent clear channel assessments (CCAs) using joint or intendent transmissions. Moreover, full duplex communication can be enabled by independent multi-band operation using FDD mode.

STA 155 transmitting frames using multiple bands simultaneously can mitigate delay and improve peak throughput of STA 155. However, in some cases, transmitting frames using multiple bands simultaneously can degrade the performance of the basic service set (BSS) comprising STA 155. For example, the performance of the BSS can be degraded when STA 155 operating on multiple bands simultaneously uses a substantial amount of the bandwidth available to the BSS due to the increased traffic. Therefore, the AP 105 can control which STAs are granted multi-band channel access, and the access can be terminated by the AP at any time, for example, based on changing network conditions or requirements.

Depending on certain conditions, such as traffic load, a non-AP STA may use fewer than all supported/available links in order to reduce energy consumption. Moreover, a non-AP STA may apply an independent power management for each link, and the AP can provide the TID-to-link mapping information for each link. Depending the Quality of Service (QoS) policy of the Basic Service Set (BSS), an AP may allocate the traffic to different links based on traffic type, such as voice, video, data, etc. For example, frames belonging to a first Traffic Identifier (TID 1) can be allocated to a first link, and frames belonging to a second Traffic Identifier (TID 2) can be allocated to a second link. In this case, the AP may provide the TID-to-link mapping information for both links to the STA, where some data can only be sent on the first link, and other data can only be sent on the second link.

Figure 2:
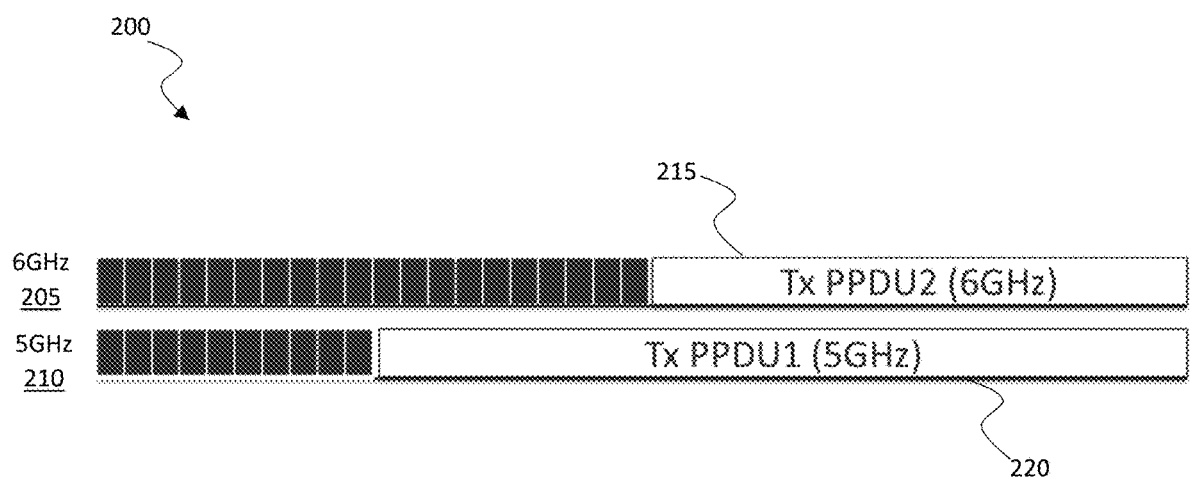
FIG. 2 is a transmission timing diagram of an exemplary multi-band wireless transmission between wireless communication devices using a 5 GHz band and a 2.4 GHz band according to embodiments of the present invention.

FIG. 2 depicts an exemplary multi-band wireless transmission diagram 200 between wireless communication devices using a 5 GHz band 205 and a 2.4 GHz band 210 according to embodiments of the present invention.

Instead of transmitting an individual ACK for every frame, multiple frames can be acknowledged together using a single Block ACK (BA) frame. A BA typically contains a bitmap size of 64 or 256 bits. Each bit of this bitmap represents the status (success/failure) of a frame. To perform cooperative multi-band operations, an AP and STA establish cooperative multi-band operations for sending frames 215 and 220 using the multiple bands. If the frames are under a block ACK agreement, an Add Block ACK (ADDBA) Request frame may be transmitted and includes multiple multi-band information elements for indicating the bands on which an STA can send frames of the TID as indicated in the ADDBA Request frame.

When an STA that is transmitting frames using one or more bands schedules a new frame transmission using a different band than the bands currently used by the STA, and the current frame is under a block ACK agreement, the STA may use the same TID for the scheduled frame only if the reordering buffer for the TID of the current frame is available. Otherwise, the STA chooses a TID for the scheduled frame that is different than the TID of the current frame.

When the current frame is not under a block acknowledgement, the STA may select the scheduled frame from the same TID with the ongoing frame only if the ongoing frame has no more retries (including a frame having the ACK Policy field set to No ACK) and the transmission end time of the scheduled frame is not earlier than the transmission end time of the current frame. Otherwise, the STA may select the scheduled frame from a TID that is different than the TID of the current frame. Scheduling the frame from a TID that is different from the TID of the current frame simplifies the transmission protocol, but the performance of the cooperative multi-band operation may be reduced.

Figure 3:
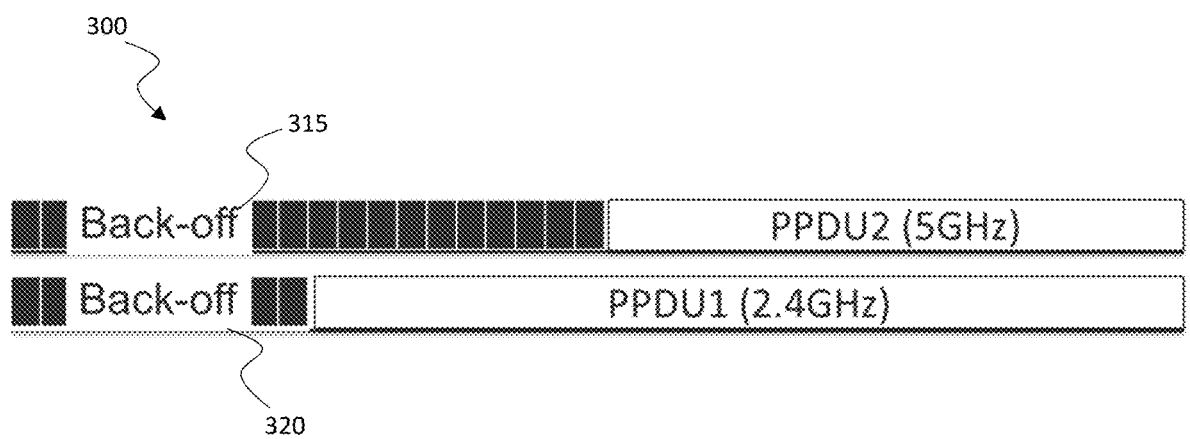
FIG. 3 is a transmission timing diagram of an exemplary STA performing channel access in multiple links independently after performing back-off procedures according to embodiments of the present invention.

To meet EHT PAR requirements, the STA should transmit frames in multiple links simultaneously. As depicted in FIG. 3, an STA performs a channel access in multiple links independently in transmission timing diagram 300. When the STA obtains TXOPs in multiple links, the STA can then simultaneously transmit frames on multiple links after waiting during back-off procedures 315 and 320. The link that the STA obtains TXOP is called the primary link.

Figure 4:
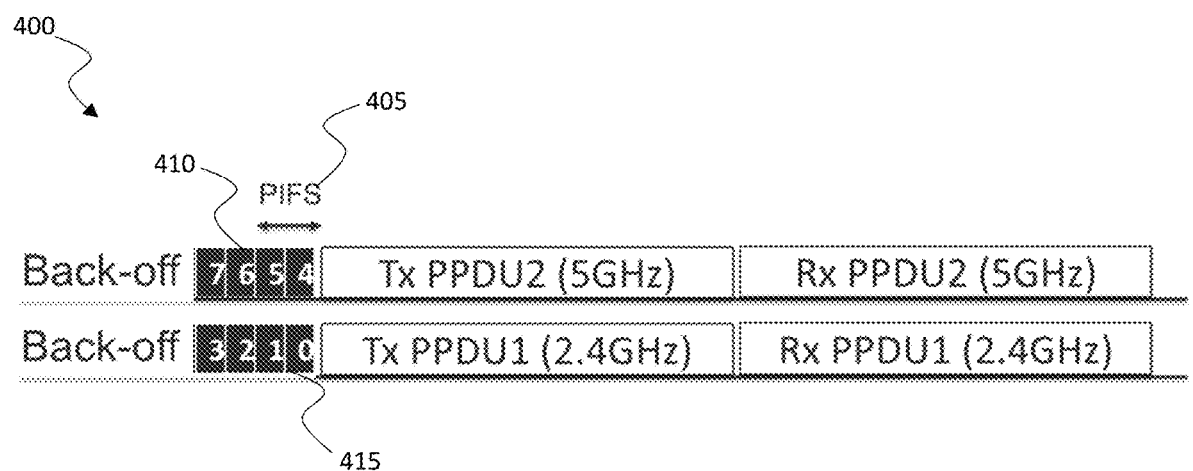
FIG. 4 is a transmission timing diagram of an exemplary STA performing carrier sensing during a point coordination function (PCF) Interframe Space period to avoid the inter-device interference depicted according to embodiments of the present invention.

With regard to FIG. 4, an exemplary transmission timing diagram 400 for avoiding the inter-device interference (IDC) based on carrier sensing (CS) is depicted according to embodiments of the present invention. To avoid or mitigate IDC after obtaining a TXOP, early access to a non-primary link (on which an EDCA back-off timer is not expired) is allowed if both physical CS (e.g., carrier sensing based on a present energy level of an antenna) and virtual CS indicate that the primary link is idle. Specifically, as depicted in FIG. 4, physical CS is performed during a PCF Interframe Space (PIFS) period 405.

The transmitting device (Tx) can determine which channel is the primary channel based on which back-off countdown 410 or 415 expires first; however, the receiving device (Rx) may not be able to determine which channel is the primary channel. Accordingly, when an STA simultaneously transmits frames on multiple links, the frames can include information indicating which link is the primary link (e.g., the link on which the STA obtained the TXOP). Therefore, a peer STA that simultaneously receives frames on multiple links can determine the primary link from the information provided by the STA that simultaneously transmits frames on multiple links.

Figure 5:
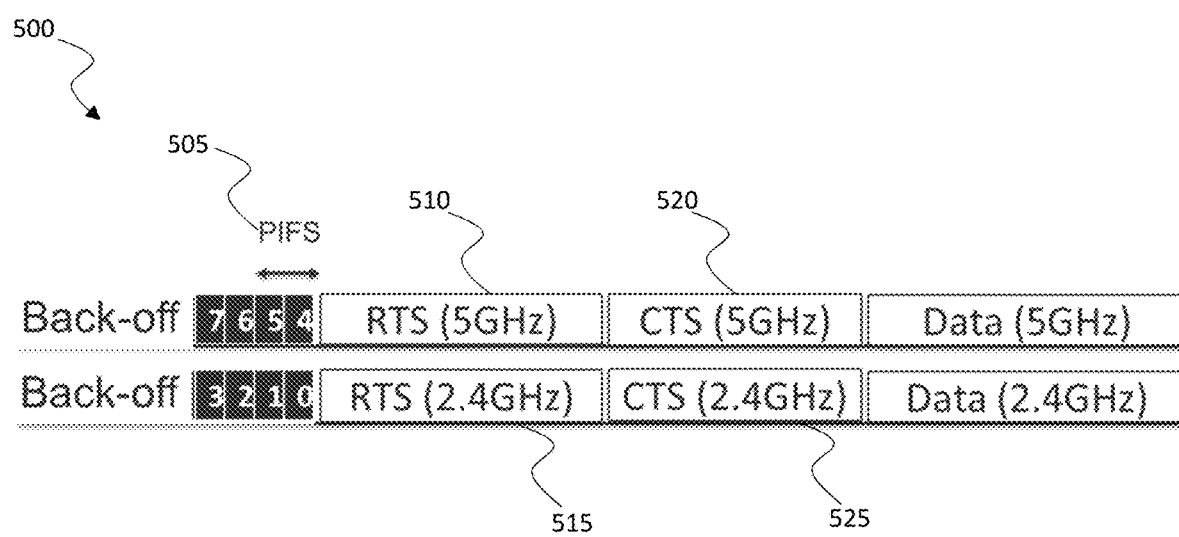
FIG. 5 is a transmission timing diagram of an exemplary STA that has obtained a TXOP on a 2.4 GHz link transmitting a request-to-send (RTS) frame using both the 2.4 GHz link and a 5 GHz link depicted according to embodiments of the present invention.

With regard to FIG. 5, an exemplary STA that obtained a TXOP on a 2.4 GHz link transmits an request-to-transmit (RTS) frame 505 using both the 2.4 GHz link and a 5 GHz link is depicted in transmission timing diagram 500 according to embodiments of the present invention. In the example of FIG. 5, the 2.4 GHz link is a primary link and the GHz link is a non-primary link. The peer STA is a target STA of RTS frames 510 and 515 and determines that the 2.4 GHz link is the primary link. The peer STA checks the physical CS and virtual CS of the primary channel of the primary link and can respond with a clear-to-transmit (CTS) frames 520 and 525 only if the primary channel of the primary link is idle. If the primary channel of the primary link is not idle, the peer STA does not respond with a CTS frame, even though other channels of the non-primary link are idle.

According to some embodiments, information identifying the primary link can be included in an A-Control field of a data frame or a management frame. The RA and/or TA fields can be swapped ("address swapping") and used to indicate the primary link. For example, the RA field of a control frame transmitted on a non-primary link can include a pre-determined value, such as the MAC address of the STA transmitting the control frame referred to as the Transmitter Address (TA). A TA in a control frame transmitted on the non-primary link can include a pre-determined value, such as the MAC address of the recipient STA that receives the control frame referred to as the Receiver Address (RA). In other words, the TA field and RA field are swapped such that the TA field includes an RA value and the RA field includes a TA value. The RA/TA field address swapping mechanism can be configured and applied using one of the following three modes:

RA field only swapping;
TA field only swapping; or
RA and TA field dual swapping.

In addition to signaling the primary link, the RA/TA field address swapping mechanism can be used advantageously to signal other information. Moreover, according to some embodiments, when the address swapping mechanism is used, the first 7 bits of the scrambling sequence can be redefined. Currently, these bits are assigned to indicating CH_BANDWIDTH_IN_NON_HT and DYN_BANDWIDTH_IN_NON_HT parameters but can be reused for other purposes.

When a peer STA receives an RTS frame on multiple links, the STA first determines if the primary link identified by the RA of the RTS frame is set to itself and if the TA of the RTS frame is set to a different STA's MAC address. Next, the STA determines the non-primary link when the RA of the RTS frame is set to the TA of the RTS frame received on the primary link and/or the TA of the RTS frame is set to the RA of the RTS frame received on the primary link. If the peer STA receives the RTS frame from the non-primary link only, the STA is unable to respond with the CTS frame.

The AP and STA must establish a multi-link setup for transmitting frames over multiple links. In one exemplary method for establishing multi-link communication, each link's MAC/PHY capabilities and operating parameters are provided. For example, an AP may assign multiple Association IDs (AIDs) to the STAs for each links. The AIDs can be used for RU allocation in the DL/UL MU PLCP Protocol Data Unit (PPDU) and the beamformee indication in the Null Data Packet (NDP) sounding mechanism. The STA that requests multi-link setup may declare the links on which the simultaneous transmission and reception are supported. Moreover, the ADDBA Request/Response frame may be used to specify links on which a block ACK agreement is established.

When the STA is transmitting frames and schedules another simultaneous transmission over a different link, the STA should consider, MAC Service Data Unit (MSDU) ordering, duplicate detection, replay detection, etc.

Figure 6:
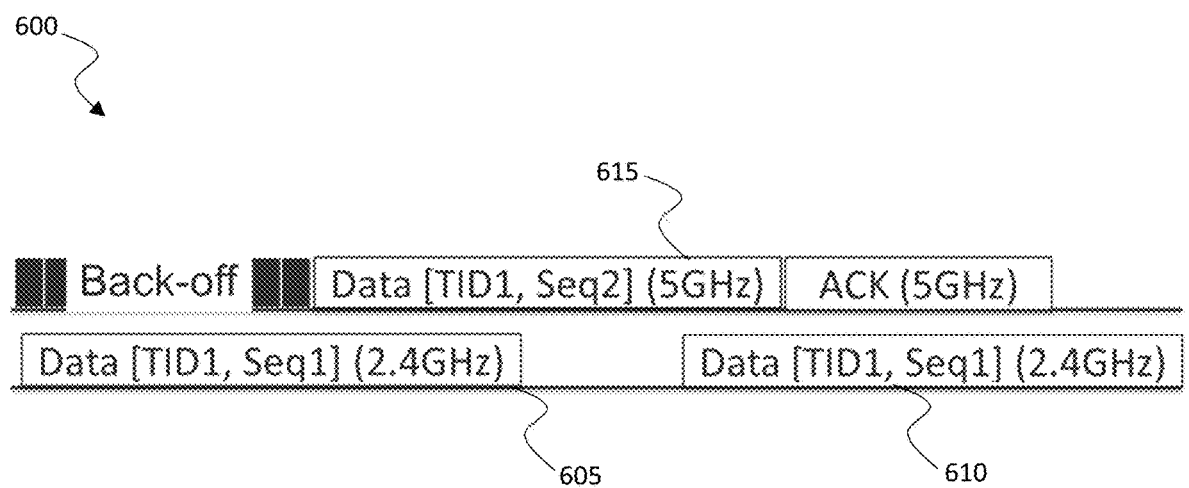
FIG. 6 is a transmission timing diagram of an STA transmitting data frames of two transmission sequences, Seq1 and Seq2, from the same traffic identifier on 2.4 GHz and 5 GHz bands simultaneously, where the ongoing frame is under no block ACK agreement, depicted according to embodiments of the present invention.

To address MSDU ordering, as depicted in FIG. 6 by exemplary transmission timing diagram 600, according to embodiments of the present invention, when the ongoing frame is under no block ACK agreement, the STA transmits data frame 605 of Seq1 and data frame 615 of Seq2 from TID1 on 2.4 GHz and 5 GHz bands simultaneously. The data frame 605 of Seq1 transmitted on 2.4 GHz band did not decode successfully, and the STA retransmits the failed data frame. The recipient STA delivers the data frame 615 of Seq2 first to an upper layer and then it delivers the retransmitted data frame 610 of Seq1 later to an upper layer. This ensures that the MSDU ordering is correct for transmitting using EHT Multi-link aggregation.

Figure 7:
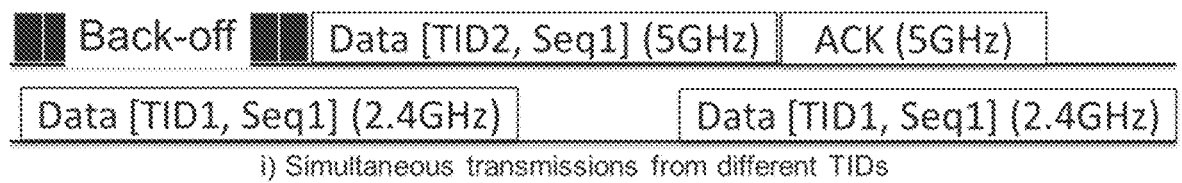
FIG. 7 is a transmission timing diagram of an STA selecting a scheduled frame having a different traffic identifier than the ongoing frame when the ongoing frame is not under a block ACK agreement according to embodiments of the present invention.
Figure 7:
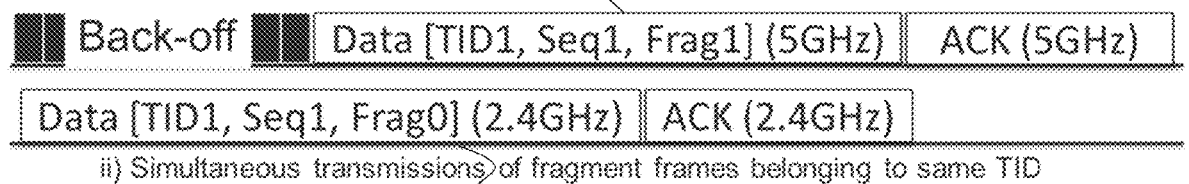

As depicted in FIG. 7 by exemplary transmission timing diagram 700, according to embodiments of the present invention, when the ongoing frame is not under a block ACK agreement, the STA selects a scheduled frame having a different traffic identifier (TID) than the ongoing frame. However, when the scheduled frame is a part of a fragmented frame, as depicted in transmission diagram 750, the STA can select the scheduled frame from among the remaining fragmented frames. For example, as depicted in FIG. 7, fragmented data frame 755 of Seq1 is transmitted on the 2.4 GHz band, and fragmented data frame 760 of Seq 1 is transmitted on the 5 GHz band. When the ongoing frame is under a block ACK agreement, the STA can select a scheduled frame from having the same TID as the ongoing frame if the reordering buffer for the TID of the ongoing frame is available; otherwise, the STA selects a scheduled frame having a TID that is different than the TID of the ongoing frame.

Embodiments of the present invention provide address duplicate detection for communication using EHT Multi-link aggregation. For individually addressed frames, if the sequence numbers of the retransmitted frames are different for each link, a recipient STA may be unable to filter out the duplicated frames. Therefore, a single sequence number space for the MSDUs sent on multiple links is used to prevent frame duplication. For group-addressed frames, if an STA receives group-addressed frames over multiple links, the STA can deliver duplicated group-addressed frames to an upper layer when the STA is not configured to perform a duplicate detection mechanism on group-addressed frames, and the STA is able to receive group-addressed frames from only a single link. Otherwise, the STA performs a duplicate detection mechanism on the group-addressed frames (e.g., Groupcast with Retries) and the STA can receive group-addressed frames from multiple links.

Moreover, to implement replay detection, for each Pair-wise Transient Key Security Association (PTKSA) and Group Transient Key Security Association (GTKSA), the recipient device maintains a separate replay counter for each TID, and uses the PN from a received frame to detect replayed frames. A replayed frame is detected when the PN from a received frame is less than or equal to the current replay counter value for the frame's MSDU or A-MSDU priority and frame type. If the PN space of the transmitted frames are different on each links, the fresh frames can be discarded. A single PN space is used for MSDUs sent on multiple links.

Synchronous Independent Channel Access Mechanism

An STA can perform independent EDCA channel access (Asynchronous Independent Channel Access) on each band with its own EDCA parameters (CWmin, CWmax, AIFS, CW, and Retry Counter). After obtaining a TXOP, the STA can initiate the transmission of a frame exchange sequence. Each MPDU can be independently encoded into one of frequency segments, and each channel can use a different back-off timer. For performing synchronous independent channel access, the AP must determine which back-off timer to use for each channel. An STA performs an independent EDCA channel access on each band with its own EDCA parameters (e.g., CWmin, CWmax, AIFS, CW, and Retry Counter).

After obtaining a TXOP, for avoiding the IDC interference, early access can be used on another primary channel where the EDCA does not obtain a TXOP if both the physical CS and the virtual CS of the channel are idle. The physical CS is checked during the PIFS. Each MPDU can be independently encoded into one of frequency segments or jointly encoded into more than one frequency segments. In this case, the AP determines which back-off rule to apply for independent EDCA channel access on each band. Accordingly, embodiments of the present invention provide back-off rules to be applied to different channels for Synchronous independent channel access.

Figure 8:
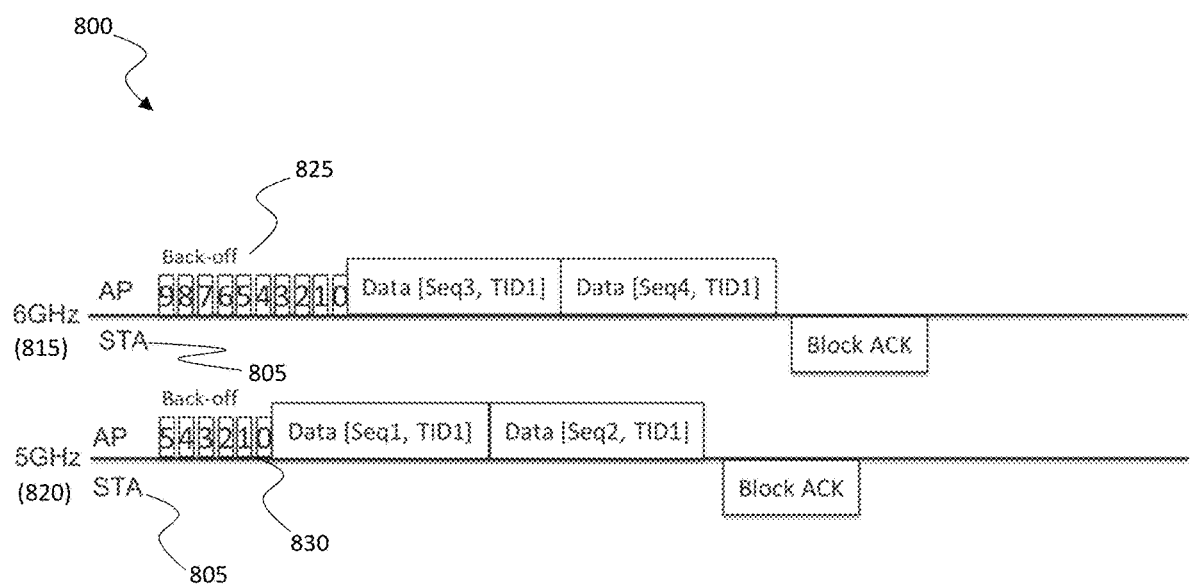
FIG. 8 is a transmission timing diagram of a back-off procedure for synchronous independent channel access depicted according to embodiments of the present invention.

With regard to FIG. 8, an exemplary transmission timing diagram 800 of a back-off procedure for asynchronous independent channel access is depicted according to embodiments of the present invention. The STA 805 performs independent EDCA channel access on the 6 GHz band 815 and the 5 GHz band 820 with its own EDCA parameters (CWmin, CWmax, AIFS, CW, and Retry Counter). After obtaining a TXOP, the STA 810 may initiate the transmission of a frame exchange sequence. Each MPDU can be independently encoded into one of several frequency segments. The exemplary back-off procedure 825 performed on the 6 GHz band 815 uses a counter value of 9, and the exemplary back-off procedure 830 performed on the 5 GHz band 820 uses a counter value of 5. As depicted in FIG. 8, the data frames are not aligned in the case of asynchronous channel access.

Figure 9:
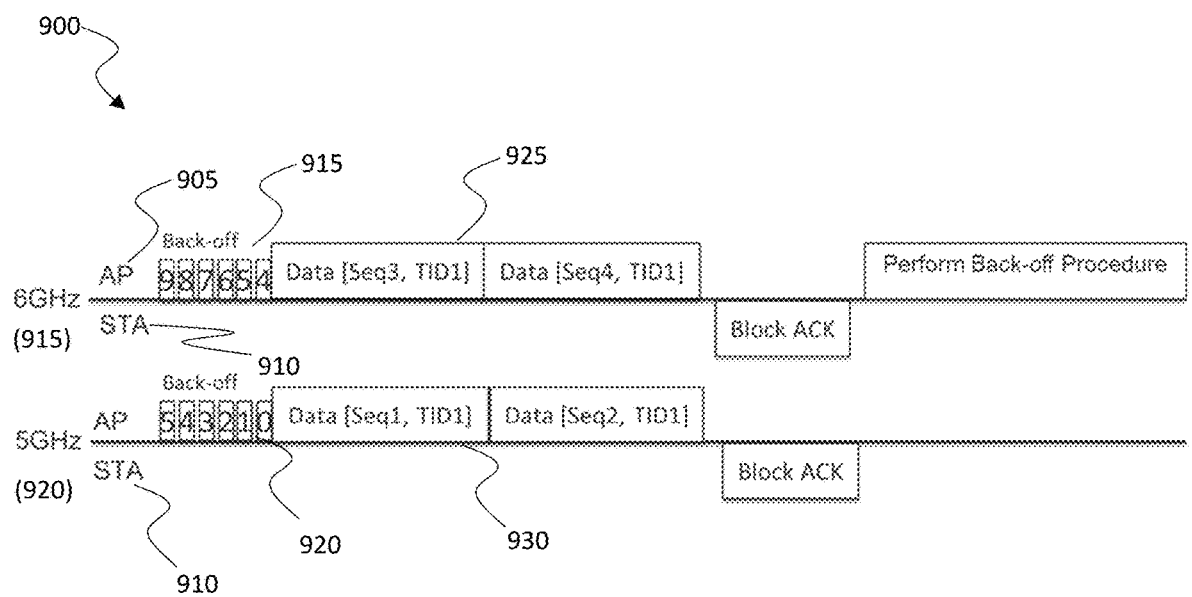
FIG. 9 is a transmission timing diagram of a back-off procedure that resumes a prior back-off counter for synchronous independent channel access depicted according to embodiments of the present invention.

With regard to FIG. 9, an exemplary transmission timing diagram 900 performing a back-off procedure that resumes a prior back-off counter for synchronous independent channel access is depicted according to embodiments of the present invention. To perform synchronous independent channel access, the data frames transmitted on the different channels need to be aligned. Therefore, the AP 905 determines which back-off rule to apply to bring the data frames into alignment, for example, on 6 GHz channel 915 and 5 GHz channel 920. The STA 910 performs an independent EDCA channel access on each band with its own EDCA parameters (e.g., CWmin, CWmax, AIFS, CW, and Retry Counter).

After obtaining a TXOP, for avoiding the IDC interference, early access can be used on another primary channel where the EDCA does not obtain a TXOP if both the physical CS and the virtual CS of the channel are idle. The physical CS can be checked during a PIFS, and each MPDU can be independently encoded into one of frequency segments or jointly encoded into more than one frequency segments. As depicted in FIG. 9, back-off counter 915 performed on the 6 GHz channel 915 counts down from 9, and back-off counter 920 performed on the 5 GHz channel 910 counts down from 5. The data frames 925 and 930 are transmitted when back-off counter 920 performed on the 5 GHz channel 920 expires. In this way the data frames transmitted on the 6 GHz channel 915 and the 5 GHz channel 920 are brought into alignment for synchronous independent channel access.

Figure 10:
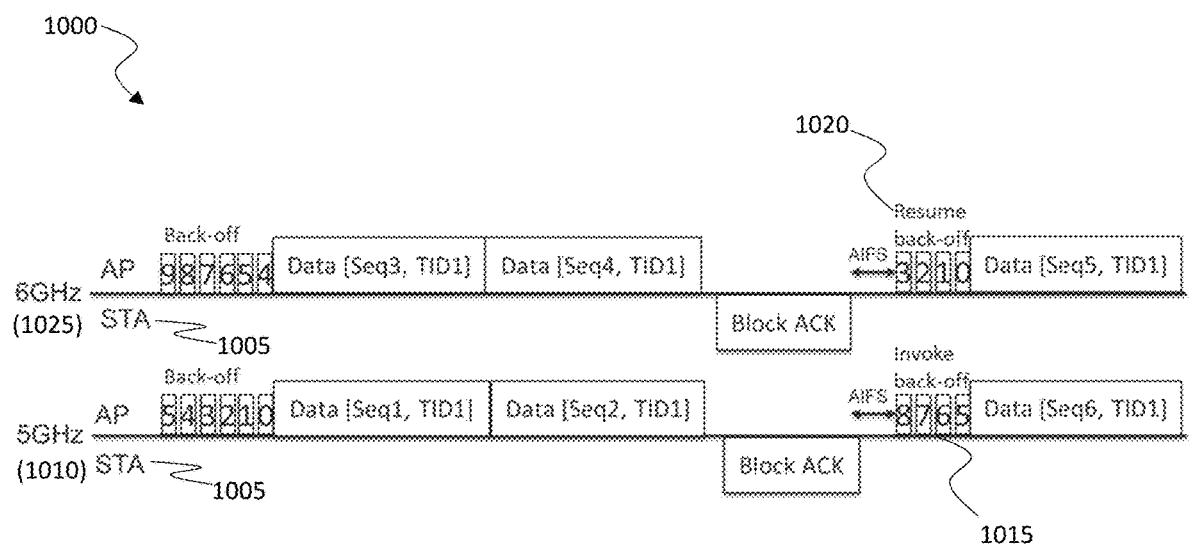
FIG. 10 is a transmission timing diagram depicting a back-off procedure performed on multiple channels for synchronous independent channel access depicted according to embodiments of the present invention.

With regard to FIG. 10, an exemplary transmission timing diagram 1000 performing a back-off procedure on multiple channels for synchronous independent channel access is depicted according to embodiments of the present invention. After completing a frame exchange sequence, STA 1005 performs a post EDCA channel access mechanism. Specifically, an EDCAF on the primary channel (e.g., 5 GHz channel 1010) on which the TXOP is obtained invokes an EDCA back-off procedure 1015. An EDCAF back-off procedure 1020 is performed on another primary channel (e.g., 6 GHz channel 1025) that uses early access of the TXOP and resumes EDCA back-off procedure 1020 continuing from the previous back-off counter. In this way the data frames transmitted on the 6 GHz channel 1020 and the 5 GHz channel 1010 are brought into alignment for synchronous independent channel access. However, this approach can lead to fairness issues as EHT STAs have a much higher channel access probability compared to legacy STAs. The issue of fairness is addressed by the embodiment depicted in exemplary transmission timing diagram 1100 of FIG. 11.

Figure 11:
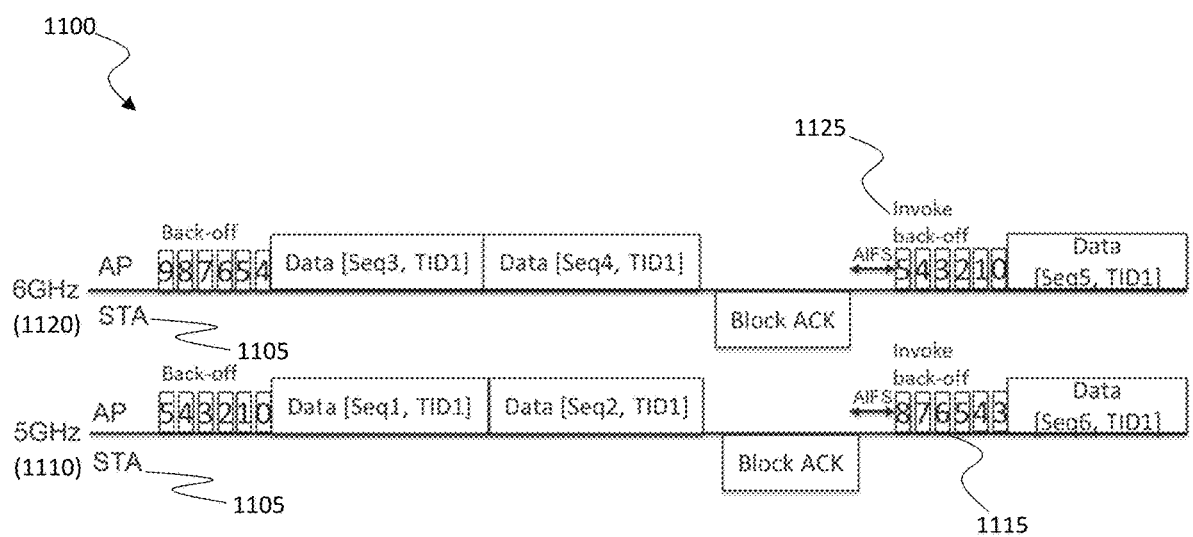
FIG. 11 is a transmission timing diagram depicting a back-off procedure performed using a random back-off counter for synchronous independent channel access depicted according to embodiments of the present invention.

With regard to FIG. 11, an exemplary transmission timing diagram 1100 performing a back-off procedure using a random back-off counter for synchronous independent channel access is depicted according to embodiments of the present invention. After completing a frame exchange sequence, STA 1105 performs a post EDCA channel access mechanism. Specifically, an EDCAF performed on the primary channel (e.g., 5 GHz channel 1110) on which the TXOP is obtained invokes an EDCA back-off procedure 1115. An EDCAF on another primary channel (e.g., 6 GHz channel 1120) on which an early access of the TXOP is used invokes an EDCA back-off procedure 1125. The issue of fairness of access is therefore improved by employing separate EDCA back-off procedures to bring the data frames in alignment rather than resuming the previous EDCA back-off counter.

Figure 12:
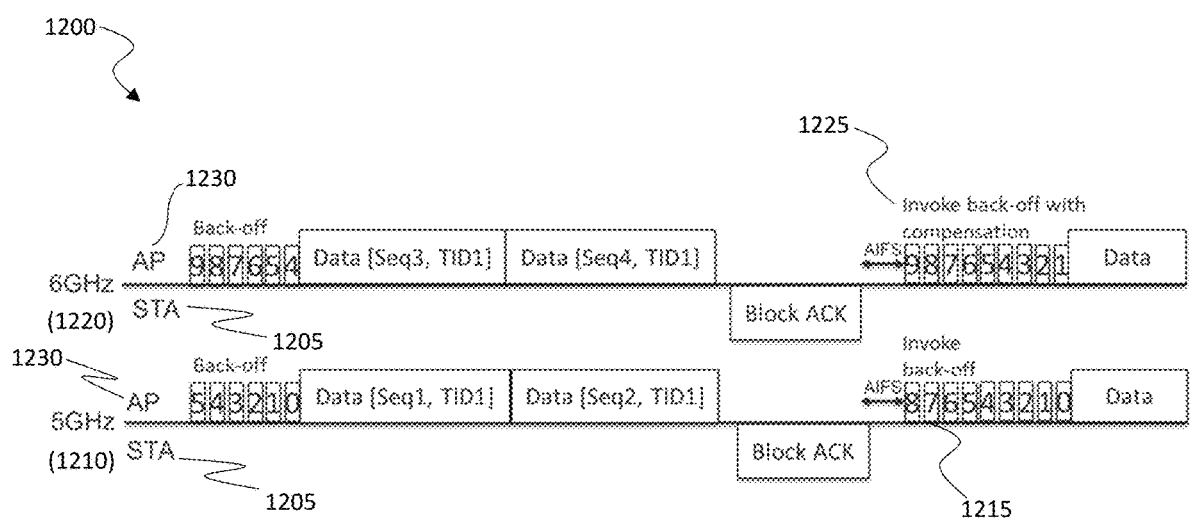
FIG. 12 is a transmission timing diagram of a back-off procedure performed based on physical CS and virtual CS for synchronous independent channel access depicted according to embodiments of the present invention.

With regard to FIG. 12, an exemplary transmission timing diagram 1200 performing a back-off procedure based on physical CS and virtual CS for synchronous independent channel access is depicted according to embodiments of the present invention. After completing a frame exchange sequence, STA 1205 performs a post EDCA channel access mechanism. Specifically, an EDCAF on the primary channel on which the TXOP is obtained (e.g., 5 GHz channel 1210) invokes an EDCA back-off procedure 1215. An EDCAF is performed on another primary channel (e.g., 6 GHz channel 1220) that uses early access of the TXOP invokes an EDCA back-off procedure 1225 including a compensation factor determined based on the previous back-off counter. To determine the compensation factor, the EDCAF first selects a random back-off counter from between 0 and the number of codewords (CW)−1. Next, the EDCAF adds the portion of previous back-off counter (the remainder) from the EDCA that has not expired because of the early channel access. As depicted in FIG. 12, AP 1230 operating in 6 GHz selects a random back-off counter (5) and adds the previous back-off counter (4). The computed back-off counter (9) is used for subsequent EDCA channel access.

Figure 13:
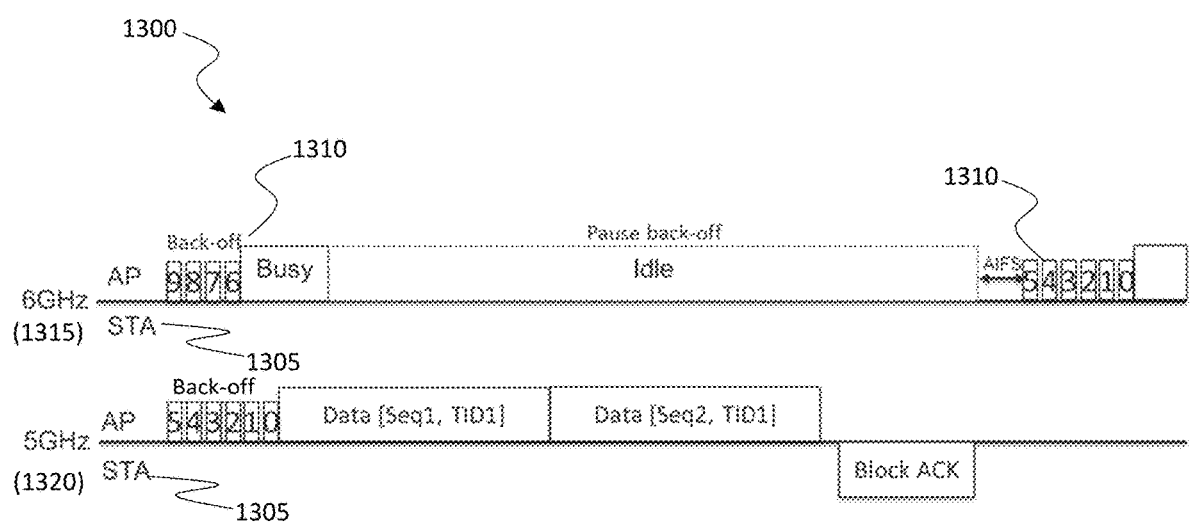
FIG. 13 is a transmission timing diagram of a back-off procedure performed using a random back-off counter for synchronous independent channel access depicted according to embodiments of the present invention.

With regard to FIG. 13, an exemplary transmission timing diagram 1300 performing a back-off procedure by pausing a back-off counter for synchronous independent channel access is depicted according to embodiments of the present invention. In some cases, an STA cannot use early access of another primary channel on which an EDCA does not obtain a TXOP because the physical CS and the virtual CS are not idle. Therefore, the STA can pause its own EDCA back-off procedure until the end of the current ongoing TXOP on a different band/channel, or continue its own EDCA back-off procedure. As depicted in FIG. 13, STA 1305 pauses its own EDCA back-off procedure 1310 on 6 GHz channel 1315 and resume the EDCA back-off procedure 1310 at the end of the ongoing TXOP on the 5 GHz channel 1320.

Figure 14:
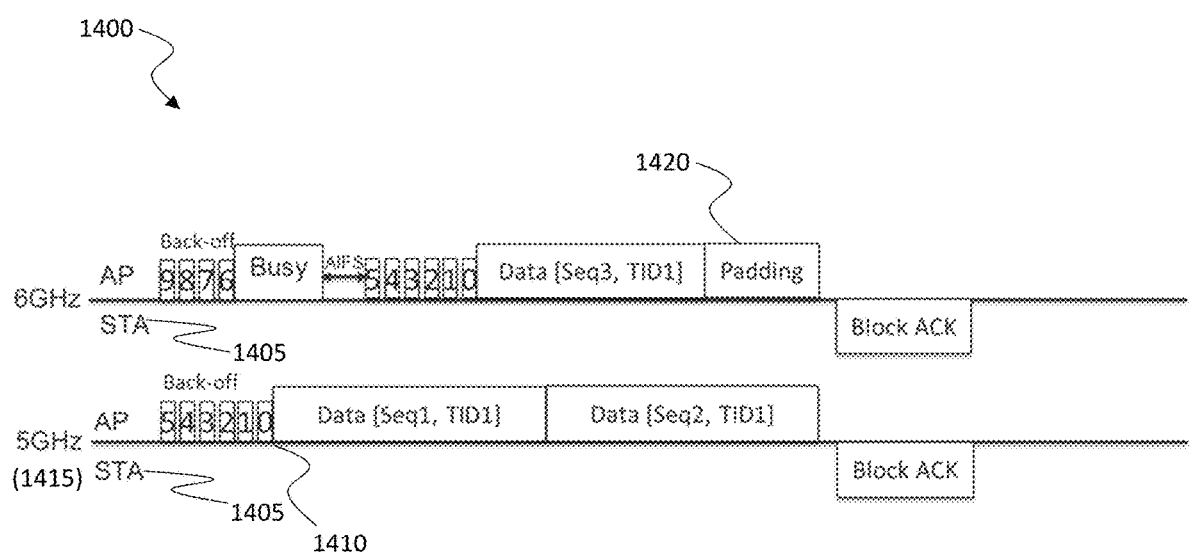
FIG. 14 is a transmission timing diagram of a back-off procedure and adjusting PPDU length using padding to synchronize transmission and reception timing on all channels of the recipient STA for synchronous independent channel access depicted according to embodiments of the present invention.

With regard to FIG. 14, an exemplary transmission timing diagram 1400 performing a back-off procedure and adjusting PPDU length to synchronize transmission and reception timing on all channels of the recipient STA for synchronous independent channel access is depicted according to embodiments of the present invention. After obtaining a TXOP, STA 1405 continues its own EDCA back-off procedure 1410 on another primary channel (e.g., 5 GHz channel 1415) that uses early access of the TXOP. After the back-off counter of the EDCAF performed on the other primary channel is expired, when the STA wants to send frames to the same recipient STA 1405, the STA 1405 adjusts the PPDU length using padding 1420 to synchronize the transmission and reception timing of all channels of recipient STA 1405 to prevent interference.

Figure 15:
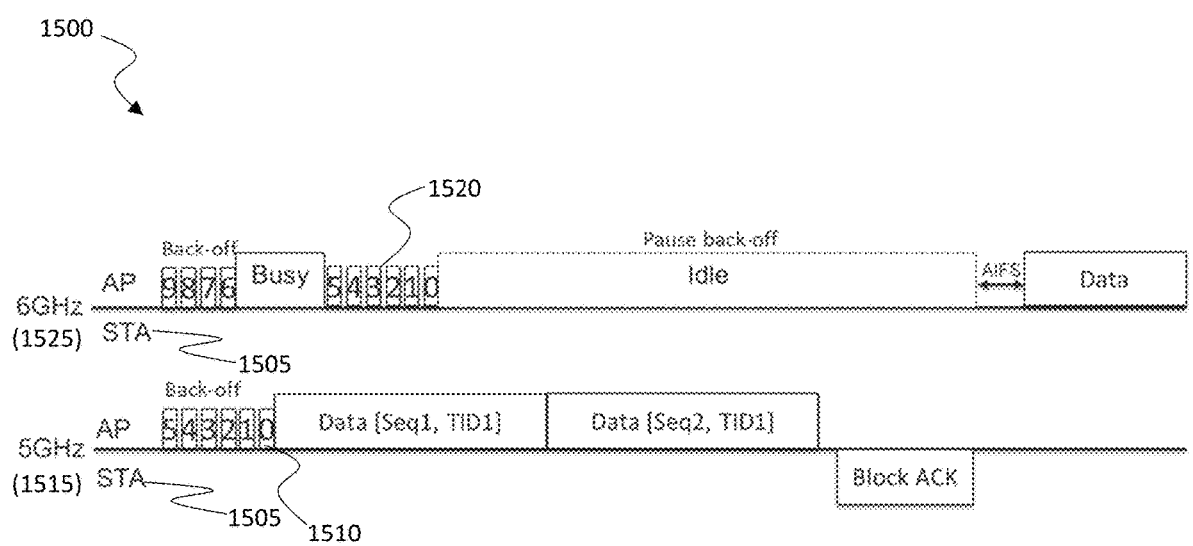
FIG. 15 is a transmission timing diagram of a back-off procedure performed by pausing an EDCA back-off procedure until the end of an ongoing TXOP on a different band/channel for synchronous independent channel access depicted according to embodiments of the present invention.

With regard to FIG. 15, an exemplary transmission timing diagram 1500 for performing a back-off procedure by pausing an EDCA back-off procedure until the end of an ongoing TXOP on another band/channel for synchronous independent channel access is depicted according to embodiments of the present invention. After obtaining a TXOP on 6 GHz channel 1525, the STA 1505 continues its own EDCA back-off procedure 1510 on another primary channel (e.g., 5 GHz channel 1515) that uses early access of the TXOP. After the back-off counter of the EDCAF on the other primary channel expires, STA 1505 can also pause transmission to obtain a TXOP when the remaining duration of the currently ongoing TXOP on the other band/channel is insufficient. In this case, STA 1505 may restart the channel access attempt by invoking the EDCA back-off procedure 1520. Alternatively, the STA can pause its own EDCA back-off procedure 1520 up to the end of current ongoing TXOP on the other primary band/channel. The STA 1505 can resume the EDCA back-off procedure 1520 with the back-off counter equal to 0 at the end of the ongoing TXOP on the other primary band/channel.

Figure 16:
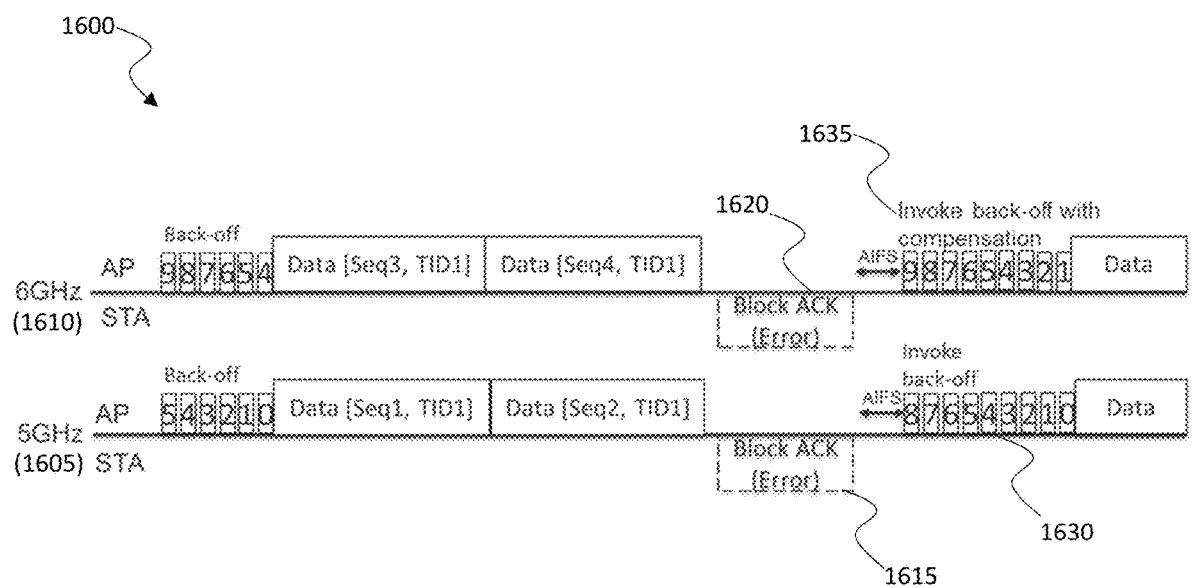
FIG. 16 is a transmission timing diagram of a back-off procedure performed subsequent to a transmission error depicted according to embodiments of the present invention.

With regard to FIG. 16, an exemplary transmission timing diagram 1600 performing a back-off procedure subsequent to a transmission error is depicted according to embodiments of the present invention. When a transmission error occurs during a TXOP, the STA may perform either an EDCA back-off procedure or a PIFS recovery procedure on each band. If the STA does not successfully decode at least one response frame from multiple bands/channels, it is considered as a transmission error. For example, as depicted in FIG. 16, the Block ACK frames 1615 and 1620 from the 5 GHz band 1605 and the 6 GHz band 1610 were not decoded successfully. Therefore, STA 1625 performs an EDCA back-off procedure 1630 and 1635 on the 5 GHz band 1605 and 6 GHz band 1610, respectively. The EDCA back-off procedure 1635 performed on 6 GHz band 1610 can include a compensation factor as described above.

Figure 17:
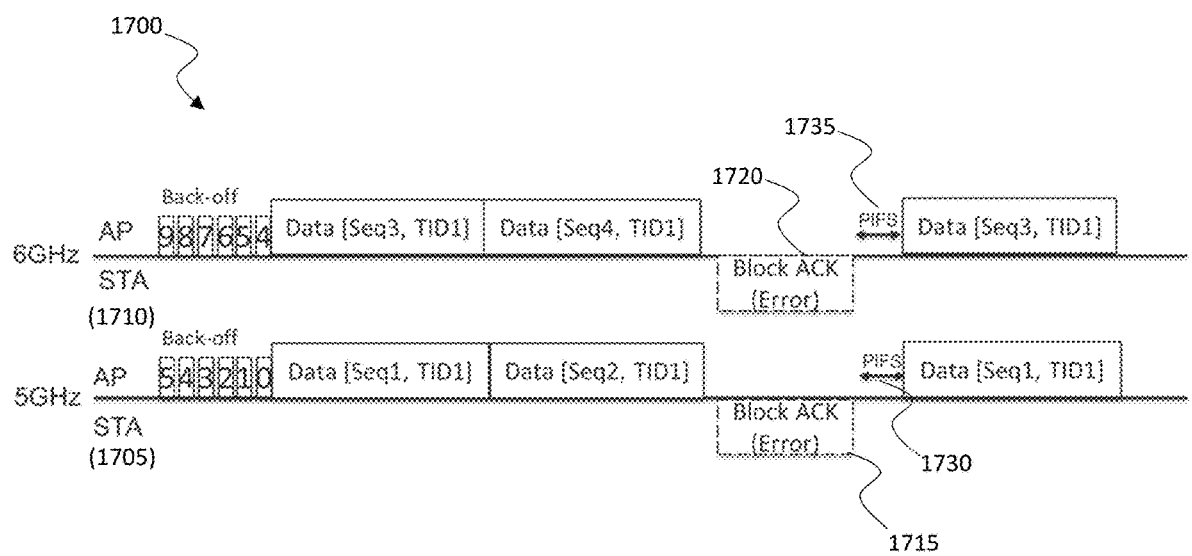
FIG. 17 is a transmission timing diagram of a back-off procedure performed subsequent to transmission errors on multiple bands depicted according to embodiments of the present invention.

With regard to FIG. 17, an exemplary transmission timing diagram 1700 performing a back-off procedure subsequent to transmission errors on multiple bands is depicted according to embodiments of the present invention. When a transmission error occurs during a TXOP, the STA may perform either an EDCA back-off procedure or a PIFS recovery procedure on each band. As depicted in FIG. 17, the Block ACK frames 1715 and 1720 from the 5 GHz band 1705 and the 6 GHz band 1710 were not decoded successfully. Therefore, STA 1725 performs a PIFS recovery procedure 1730 and 1735 on the 5 GHz 1705 band and 6 the GHz band 1710, respectively.

Figure 18:
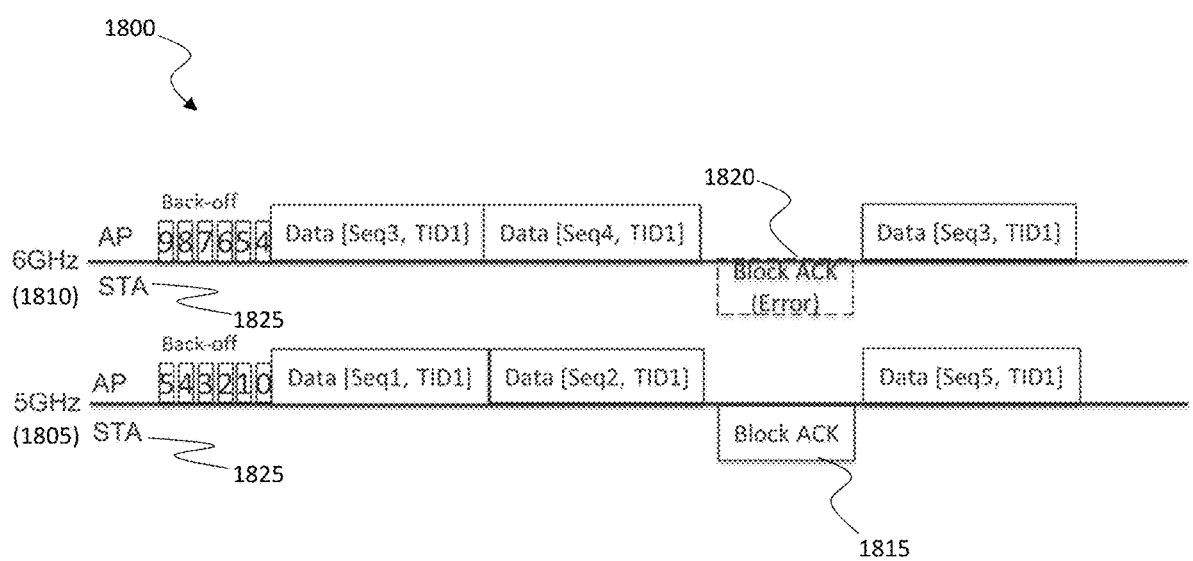
FIG. 18 is a transmission timing diagram of a back-off procedure performed subsequent to a transmission error on a single band depicted according to embodiments of the present invention.

With regard to FIG. 18, an exemplary transmission timing diagram 1800 performing a back-off procedure subsequent to a transmission error on a single band is depicted according to embodiments of the present invention. As depicted in FIG. 18, a Block ACK frame 1815 transmitted on the 5 GHz 1805 band are successfully decoded but Block ACK frames 1820 transmitted on the 6 GHz band 1810 are not decoded successfully. In this case, STA 1825 continues the remaining frame exchange sequence because Block ACK frame 1815 transmitted on the 5 GHz 1805 band were successfully decoded. Therefore, the transmission is considered to be successful.

Figure 19:
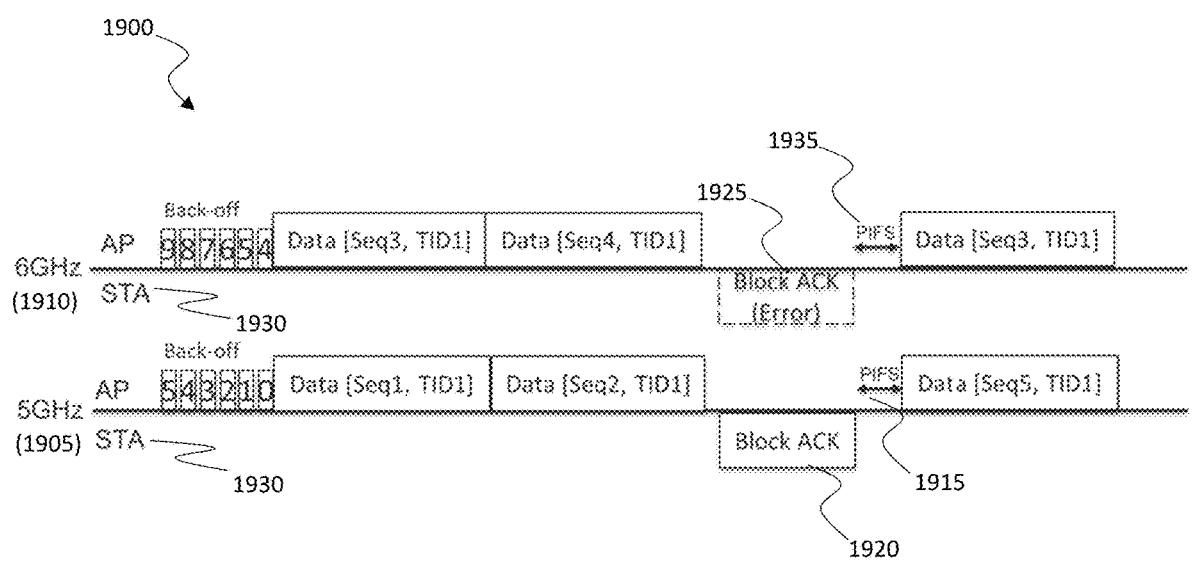
FIG. 19 is a transmission timing diagram of a back-off procedure performed subsequent to a transmission error on a single band and a PIFS recovery procedure depicted according to embodiments of the present invention.

With regard to FIG. 19, an exemplary transmission timing diagram 1900 performing a back-off procedure subsequent to a transmission error on a single band and a PIFS recovery procedure is depicted according to embodiments of the present invention. During the TXOP, even though the transmission is considered to be successful, STA 1930 can perform a PIFS recovery procedure to check the channel availability. In this case, the PIFS recovery procedures 1915 and 1935 are applied on all bands/channels for maintaining synchronization. For example, block ACK frame 1920 from the 5 GHz band 1905 is successfully decoded, but block ACK frame 1925 from the 6 GHz band 1910 is not decoded successfully. Therefore, the STA 1930 performs PIFS recovery procedure 1915 on the 5 GHz band 1905 and PIFS recovery procedure 1935 on the 6 GHz band 1910 to maintain synchronization.

Figure 20:
FIG. 20 is a flowchart of an exemplary sequence of computer implemented steps for performing synchronous independent channel access depicted according to embodiments of the present invention.

FIG. 20 is a flowchart of an exemplary sequence of computer implemented steps of a process 2000 for performing synchronous independent channel access depicted according to embodiments of the present invention. The process 2000 can be performed in one implementation by a dual-band wireless STA in communication with a dual-band wireless AP configured for synchronous independent channel access.

At step 2005, independent EDCA channel access is performed on the first primary wireless channel and a second primary wireless channel.

At step 2010, a first MAC protocol data unit (MPDU) is encoded for transmission on the first primary wireless channel and a second MPDU is encoded for transmission on the second primary wireless channel.

At step 2015, the first MPDU is transmitted on the first primary wireless channel and the second MPDU is transmitted on the second primary wireless channel in synchronization with the first MPDU being transmitted on the first primary wireless channel. According to some embodiments, the transmission of the first MPDU and the second MPDU are synchronized using back-off procedures and/or padding such that the ending time of transmitted frames are aligned.

Exemplary Computer Controlled System

Embodiments of the present invention are drawn to electronic systems for performing synchronous independent channel access in a wireless network. The following discussion describes one such exemplary electronic system or computer system that can be used as a platform for implementing embodiments of the present invention.

Figure 21:
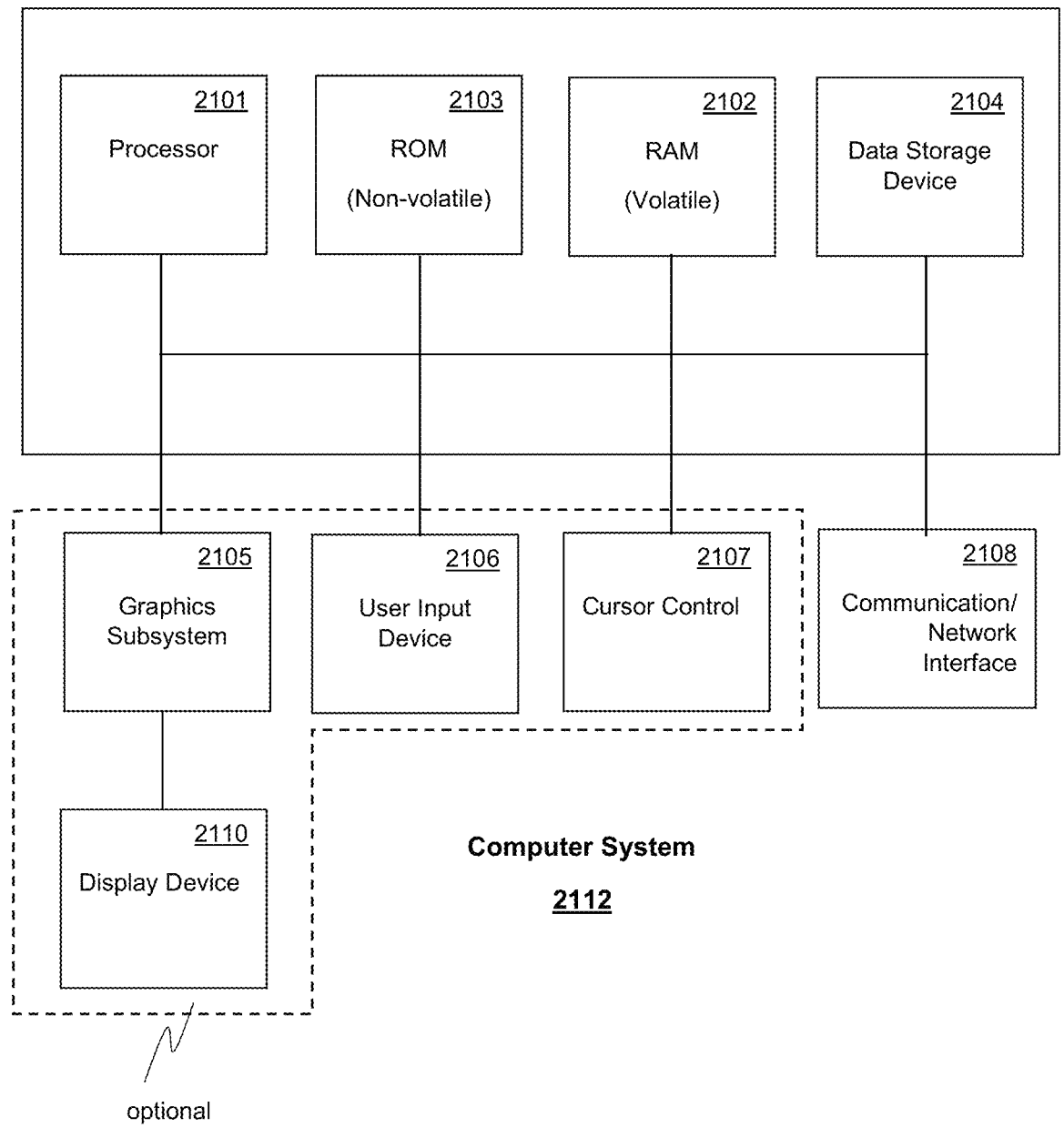
FIG. 21 is a block diagram depicting an exemplary computer system platform upon which embodiments of the present invention may be implemented.

In the example of FIG. 21, the exemplary computer system 2112 (e.g., a multi-band cooperative wireless access point AP or a multi-band cooperative wireless station STA) includes a central processing unit (such as a processor or a CPU) 2101 for running software applications and optionally an operating system. Random access memory 2102 and read-only memory 2103 store applications and data for use by the CPU 2101. Data storage device 2104 provides non-volatile storage for applications and data and may include fixed disk drives, removable disk drives, flash memory devices, and CD-ROM, DVD-ROM or other optical storage devices. The optional user inputs 2106 and 2107 comprise devices that communicate inputs from one or more users to the computer system 2112 (e.g., mice, joysticks, cameras, touch screens, and/or microphones).

A communication or network interface 2108 includes a plurality of transceivers and allows the computer system 2112 to communicate with other computer systems, networks, or devices via an electronic communications network, including wired and/or wireless communication and including an Intranet or the Internet (e.g., 802.11 wireless standard). The communication or network interface 2108 can operate multiple transceivers simultaneously e.g., Transceiver 1 and Transceiver 2. The communication or network interface 2108 can further include a cooperative management unit for coordinating the data sent and/or received by the transceivers. The communication or network interface 2108 and can include a dual band interface that can operate in multiple bands simultaneously, such as 2.4 GHz, 5 GHz, and/or 6 GHz. Various back-off procedures can be performed by the computer system 2112 to synchronize simultaneous communication over the multiple transceivers.

The optional display device 2110 may be any device capable of displaying visual information in response to a signal from the computer system 2112 and may include a flat panel touch sensitive display, for example, and may be remotely disposed. The components of the computer system 2112, including the CPU 2101, memory 2102/2103, data storage 2104, user input devices 2106, and graphics subsystem 2105 may be coupled via one or more data buses.

Some embodiments may be described in the general context of computer-executable instructions, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Embodiments of the present invention are thus described. While the present invention has been described in particular embodiments, it should be appreciated that the present invention should not be construed as limited by such embodiments, but rather construed according to the following claims.

What is claimed is:

1. A method of synchronous independent channel access, the method comprising:
    performing independent enhanced distributed channel access function (EDCA) channel access on a first primary wireless channel and on a second primary wireless channel;
    encoding a first MAC protocol data unit (MPDU) for transmission on the first primary wireless channel;
    encoding a second MPDU for transmission on the second primary wireless channel;
    performing a back-off procedure on the first primary wireless channel;
    obtaining a transmission opportunity (TXOP) on the first primary wireless channel;
    transmitting the first MPDU on the first primary wireless channel;
    performing a second back-off procedure on the second primary wireless channel;
    obtaining a TXOP on the second primary wireless channel;
    adding padding to the second MPDU to adjust a length of the second MPDU to align an ending time of the first MPDU transmitted on the first primary wireless channel with an ending time of the second MPDU to be transmitted on the second primary wireless channel; and
    transmitting the second MPDU on the second primary wireless channel, wherein the ending time of the first MPDU is substantially concurrent with the ending time of the second MPDU.

2. The method as described in claim 1, further comprising:
    performing carrier sensing to determine that the second primary wireless channel is idle; and
    accessing the second primary wireless channel prior to obtaining a TXOP on the second primary wireless channel when the second primary wireless channel is idle.

3. The method described in claim 2, wherein the performing carrier sensing comprises performing physical carrier sensing and virtual carrier sensing.

4. The method described in claim 1, wherein the first back-off procedure comprises a compensation factor based on a previous back-off counter.

5. The method described in claim 4, wherein the first back-off procedure further comprises a randomly selected value.

6. The method described in claim 1, further comprising pausing transmission on the first primary wireless channel to obtain the TXOP.

7. The method described in claim 1, wherein the first primary wireless channel comprises a 6 GHz wireless channel and the second primary wireless channel comprises a 5 GHz wireless channel.

8. The method described in claim 1, wherein the first primary wireless channel comprises a 6 GHz wireless channel and the second primary wireless channel comprises a 6 GHz wireless channel.

9. The method described in claim 1, wherein the first primary wireless channel comprises a 5 GHz wireless channel and the second primary wireless channel comprises a 2.4 GHz wireless channel.

10. The method of claim 1, wherein the second MPDU comprises a trigger frame, and wherein the adding padding to the second MPDU comprises adding padding to a padding field of the trigger frame.

11. A dual-band device for performing cooperative multi-band operation with a wireless access point (AP) for a wireless network, the device comprising:
    a first transceiver configured to communicate over a first primary wireless band;
    a second transceiver configured to communicate over a second primary wireless band, wherein the first transceiver and the second transceiver are operable to communicate simultaneously;
    a cooperative management unit configured to exchange data with the first transceiver and the second transceiver for managing simultaneous communication of the first transceiver and the second transceiver; and
    a processor operable to:
        perform independent enhanced distributed channel access function (EDCA) channel access on the first primary wireless channel and on a second primary wireless channel;
        encode a first MAC protocol data unit (MPDU) for transmission on the first primary wireless channel;
        encode a second MPDU for transmission on the second primary wireless channel;
        obtain a transmission opportunity (TXOP) on the first primary wireless channel;

perform a back-off procedure on the first primary wireless channel;
obtain a TXOP on the second primary wireless channel;
perform a second back-off procedure on the second primary wireless channel;
add padding to the second MPDU to adjust a length of the second MPDU to align an ending time of the first MPDU transmitted on the first primary wireless channel with an ending time of the second MPDU to be transmitted on the second primary wireless channel, wherein the first and second transceivers are operable to:
transmit the first MPDU on the first primary wireless channel; and
transmit the second MPDU on the second primary wireless channel, wherein the ending time of the first MPDU is substantially concurrent with the ending time of the second MPDU.

12. The device as described in claim 11, wherein the processor is further operable to:
perform carrier sensing to determine that the second primary wireless channel is idle; and
access the second primary wireless channel prior to obtaining a TXOP on the second primary wireless link when the second primary wireless channel is idle.

13. The device described in claim 12, wherein the carrier sensing comprises performing physical carrier sensing and virtual carrier sensing.

14. The device described in claim 11, wherein the first back-off procedure comprises a compensation factor based on a previous back-off counter.

15. The device described in claim 14, wherein the first back-off procedure further comprises a randomly selected value.

16. The device described in claim 11, wherein the processor is further operable to pause transmission on the first primary wireless channel to obtain the TXOP.

17. The device described in claim 11, wherein the first primary wireless channel comprises a 6 GHz wireless channel and the second primary wireless channel comprises a 5 GHz wireless channel.

18. The device described in claim 11, wherein the first primary wireless channel comprises a 6 GHz wireless channel and the second primary wireless channel comprises a 6 GHz wireless channel.

19. A non-transitory computer-readable storage medium having embedded therein program instructions, which when executed by one or more processors of a device, causes the device to execute a process for performing synchronous independent channel access, the method comprising:
performing independent enhanced distributed channel access function (EDCA) channel access on a first primary wireless channel and on a second primary wireless channel;
encoding a first MAC protocol data unit (MPDU) for transmission on the first primary wireless channel;
encoding a second MPDU for transmission on the second primary wireless channel;
obtaining a transmission opportunity (TXOP) on the first primary wireless channel;
performing a back-off procedure on the first primary wireless channel;
transmitting the first MPDU on the first primary wireless channel;
obtaining a TXOP on the second primary wireless channel;
performing a second back-off procedure on the second primary wireless channel;
adding padding to the second MPDU to adjust a length of the second MPDU to align an ending time of the first MPDU transmitted on the first primary wireless channel with an ending time of the second MPDU to be transmitted on the second primary wireless channel; and
transmitting the second MPDU on the second primary wireless channel, wherein the ending time of the first MPDU is substantially concurrent with the ending time of the second MPDU.

* * * * *